May 16, 1967  R. A. MAGNUSON  3,319,492
MULTI-STAGE REDUCTION GEARED WINCH
Filed Aug. 20, 1964  3 Sheets-Sheet 1
FIG___1
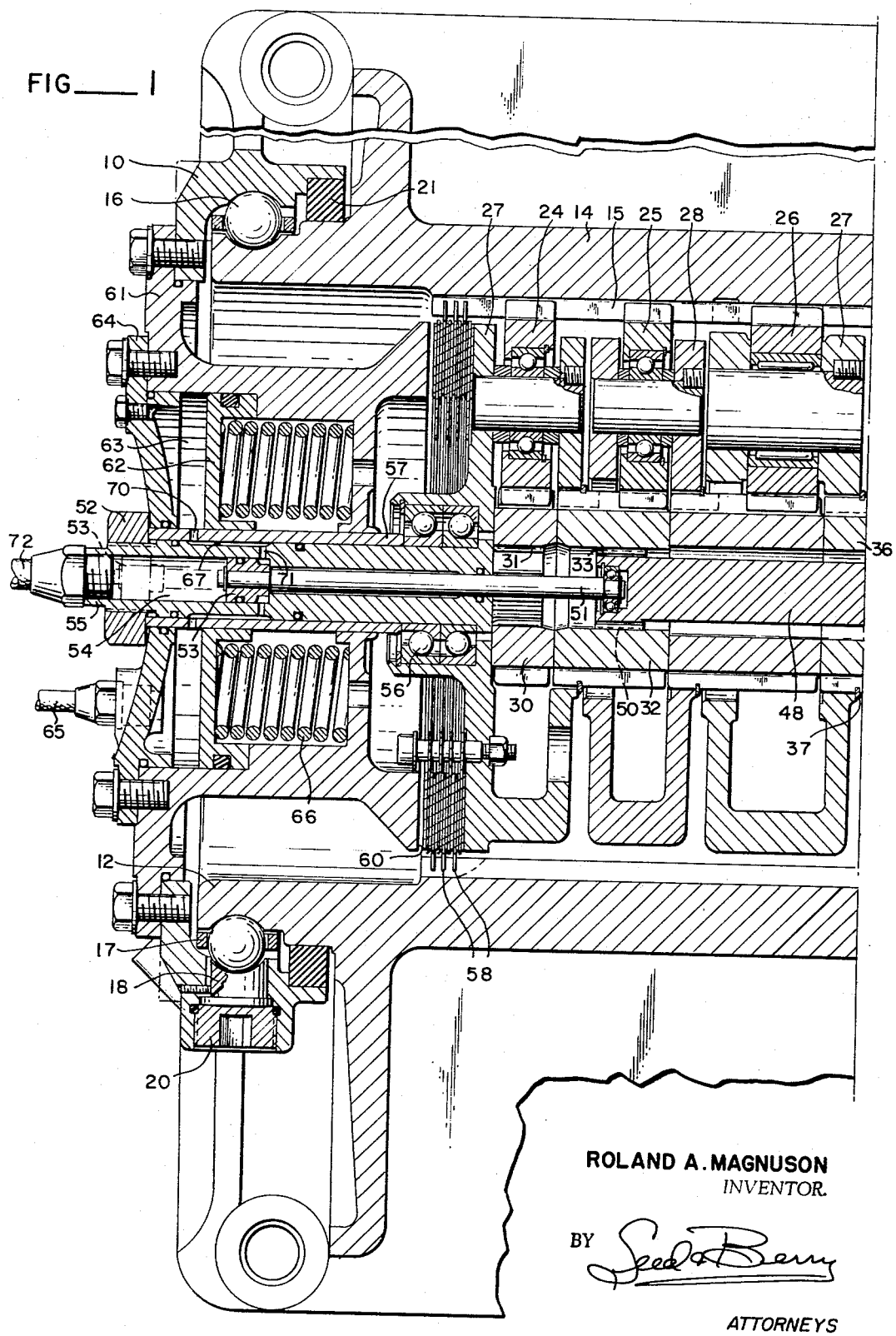
ROLAND A. MAGNUSON
INVENTOR.
BY *Seed & Berry*
ATTORNEYS

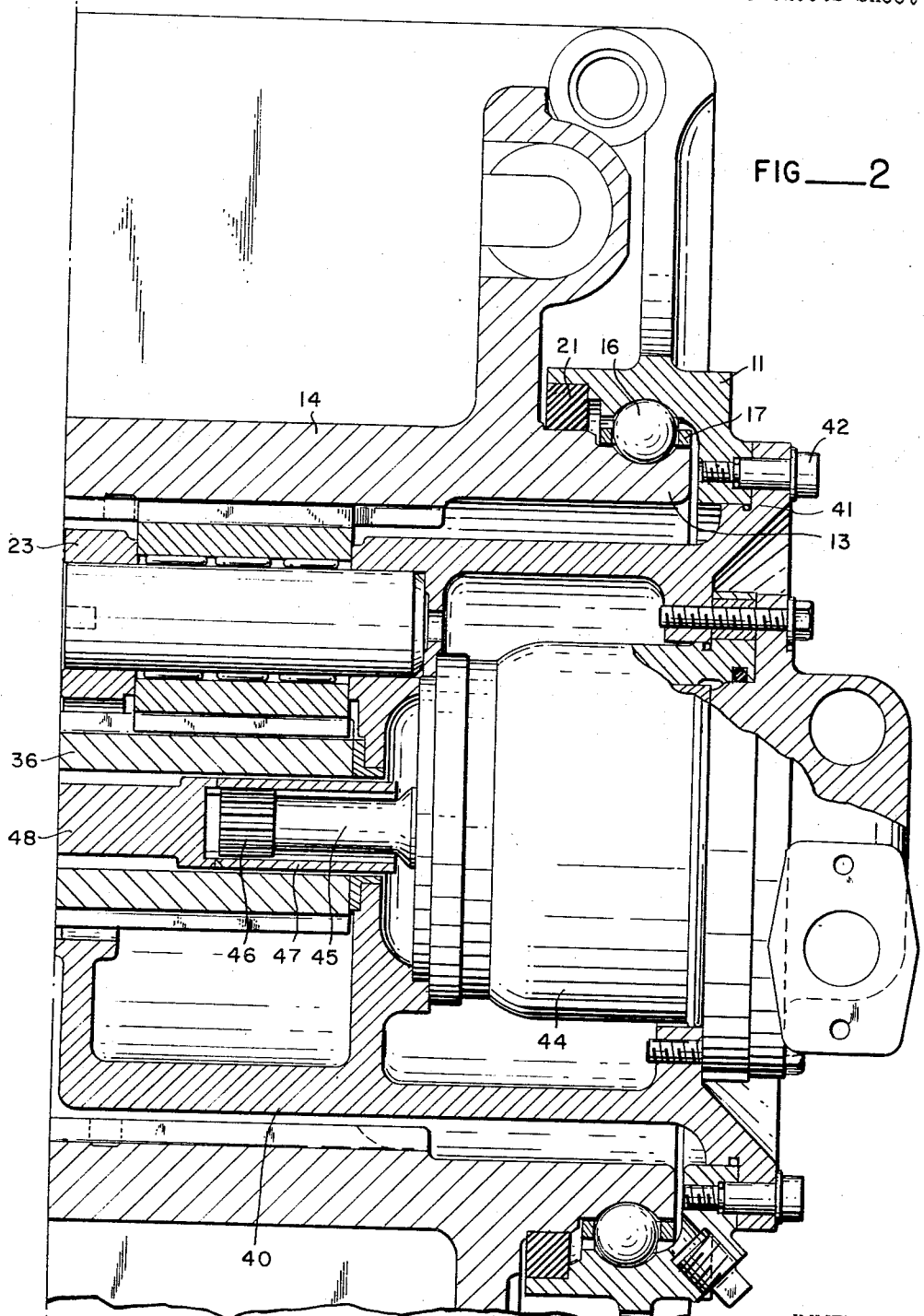

May 16, 1967 R. A. MAGNUSON 3,319,492
MULTI-STAGE REDUCTION GEARED WINCH
Filed Aug. 20, 1964
3 Sheets-Sheet 3
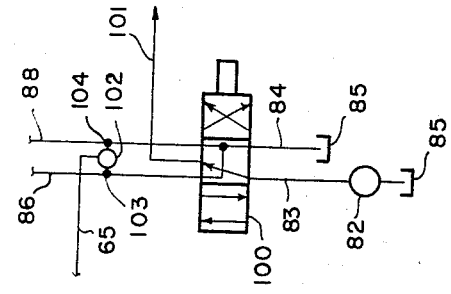
FIG__4
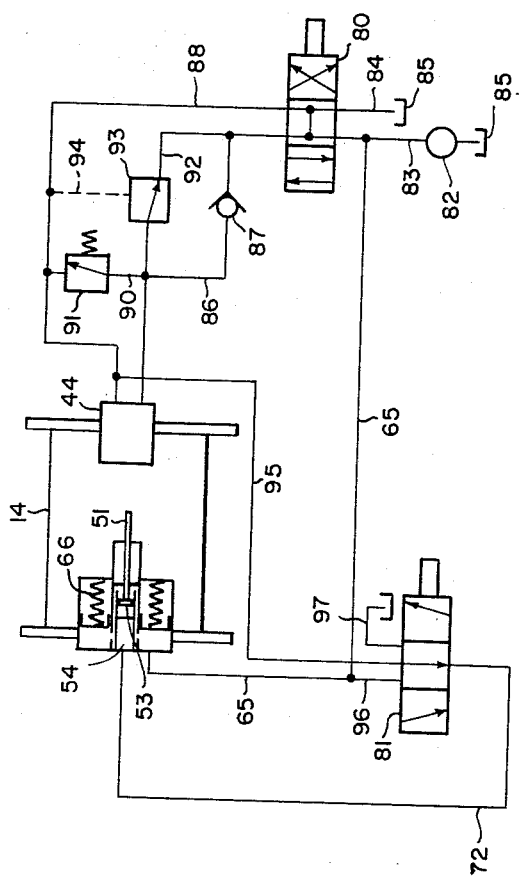
FIG__3
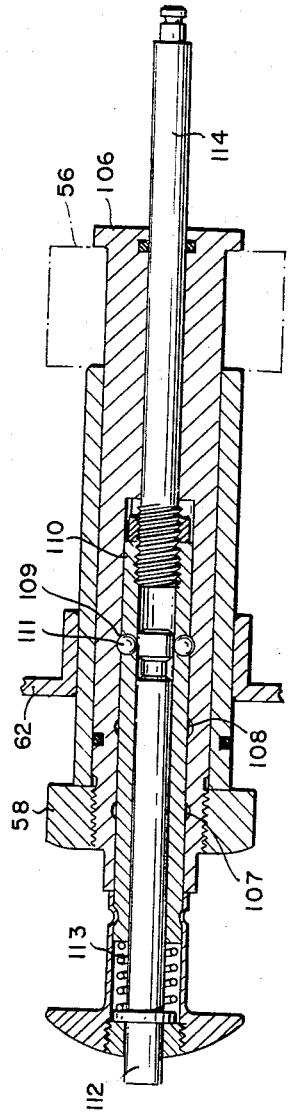
FIG__5
ROLAND A. MAGNUSON
INVENTOR.
BY *Seed & Berry*
ATTORNEYS 3,319,492
MULTI-STAGE REDUCTION GEARED WINCH
Roland A. Magnuson, Renton, Wash., assignor to Pacific Car and Foundry Company, a corporation of Washington
Filed Aug. 20, 1964, Ser. No. 390,977
16 Claims. (Cl. 74—750)

This invention relates to a power winch of the type illustrated and described in my U.S. Pat. No. 3,055,237, issued Sept. 25, 1962, namely a planetary geared winch powered, or adapted to be powered, by a reversible hydraulic motor and one providing two gear ratios selectively employed.

The present invention is directed to an improved version of the patented winch. The particular improvements and the advantages achieved thereby will appear in the course of the following description and claims, the invention consisting in the novel construction and in the adaptation and combination of parts hereinafter described and claimed.

In the accompanying drawings:

FIGURES 1 and 2 are longitudinal vertical sectional views which, taken together, portray a winch embodying preferred teachings of the present invention.

FIG. 3 is a schematic illustration of the preferred hydraulic circuitry of the winch.

FIG. 4 is a schematic illustration of a portion of a modified circuit; and

FIG. 5 is a fragmentary longitudinal vertical sectional view illustrating a shift mechanism for selecting the gear ratios modified from the disclosure of FIGS. 1 and 2 in that it is manually rather than hydraulically actuated.

Referring to said drawings, the numerals 10 and 11 denote axially spaced cheek bitts bolted or otherwise rigidly secured to a foundation. Ring-shaped co-axial openings are presented by these bitts, and extending into the openings to deceive a journal mounting from the bitts are terminal necks, as 12 and 13, prolonged axially from the two ends of a spooling drum 14.

The drum is hollow with both ends open, and is provided with internal gear teeth 15. Other than for the neck prolongations 12 and 13, which are interiorly smooth-faced with an inside diameter moderately larger than the root limit of the gear teeth, said gear teeth extend the full length of the drum. Trains of balls 16 provide the journal for the drum, surrounding the neck prolongations in pockets provided by annular cages 17 and bearing directly against the neck prolongations and the ring portions of the bitts in grooves provided thereby. The balls are introduced through radial access openings bored in the ring portions of the bitts. Plugs 18 and follower screws 20 normally close the access openings. 21 denotes oil seals.

The internal gear teeth are meshed by plural axially spaced sets of pinions. As here illustrated, four sets are provided. Considered from the vantage point of the drawing, the pinions 22 of the set which occupies a position at the right-hand end of the internal gear teeth turn about axes which are fixed in relation to the cheek bitts. This end will be hereinafter referred to as the back end. The drum turns by torque passed from the pinions 22 to the internal gear teeth 15. A stationary carrier for these pinions is denoted by 23. The pinions 24, 25 and 26, respectively, of the other three sets are each planetary. Carriers therefor are denoted by 27, 28 and 29.

Planetary pinions 24, these being the pinions which lie most distal to the pinions 22 at the front end of the internal gear teeth, are in constant mesh with a sun pinion 30. The sun pinion has an open center in which internal teeth 31 are presented. To the immediate rear of the sun pinion 30 is a somewhat longer center pinion 32.

The front end of this pinion functions in the manner of a quill shaft, being splined or otherwise drive-fitted within the after end of the carrier 27. The rear end of the pinion 32 acts as a sun pinion for the planetary pinions 25. As with the sun pinion 30, pinion 32 has an open center in which is presented a counterpart 33 of the internal teeth 31. A smooth-faced surface separates the internal teeth 33 from the internal teeth 31.

Two smooth-bored open-center center pinions 35 and 36 lie to the rear of the center pinion 32. As with the latter, the front ends serve as quill shafts, being splined within the after end of the respective preceding carrier, as 28 and 29, and having the after ends in mesh with a related set of the pinions, namely the pinions 26 and 22, respectively. Snaprings 37 tie the carriers 27, 28 and 29 to the related quill shafts.

For localizing the stationary carrier 23, a tubular prolongation 40, thereof extends rearwardly within the hollow center of the drum's rear terminal neck 13 and upon its after end presents outwardly and inwardly directed flanges. The outwardly directed flange 41 is secured by bolts 42 to the rear cheek bitt 11. The inwardly directed flange 43 provides a mounting for a versible hydraulic motor 44 which serves as the power source for the winch. The motor has its nose piloted in the back wall of the stationary carrier 23 and is substantially wholly housed within said tubular prolongation 40 of the carrier. The motor's output shaft 45 extends forwardly along the axial line of the winch. Splines 46 upon the front end fit internal splines provided within the hollow after end 47 of a drive spindle 48. The drive spindle has external teeth 50 at the front end formed as a mating complement of the internal teeth 31 and 33 of the two sun pinions 30 and 32, respectively. Shuttle movement of the drive spindle between a front limit meshing the external teeth 50 with the internal teeth 31, and a rear limit meshing the external teeth 50 with the internal teeth 33, is provided by a ratio-selector stem 51.

Hereinafter described hydraulically operated mechanisms for the control of said stem, and for the control of a set of drum-braking friction plates 52, are wholly housed within the hollow center of the drum's front terminal neck 12. Having the hydraulic motor housed within the drum's rear terminal neck, and said ratio and brake control mechanisms housed within the drum's front terminal neck makes for unusual compactness. Fore and aft space requirements of the winch, excepting for hydraulic connections leading to the winch from hereafter described control valves remote to the winch, approximate the over-all length of the spooling drum.

Proceeding now to describe said control mechanisms, the selector stem 51 extends forwardly from the drive spindle and upon its front end is fitted with a double-acting piston 53. A bore 54 formed in the outer end of a spool 55 provides the cylinder for the piston. The spool has an enlarged head upon its inner end, and the inner race of a ball bearing 56 is clamped between this head and a sleeve 57 which fits the spool. A nut 52 threaded upon the outer end of the spool exerts the clamping force. The spool admits to endwise motion, and the bearing 56 provides a coupling between the spool and the carriage 27 for the planetary pinions 24, allowing the carriage to rotate freely while moving in concert with the spool as the latter is shifted endwise to its axis. This shift motion, when outwardly and inwardly directed, respectively, sets and releases brake friction plates 58. These plates lie at the front end of the carriage 27 between the carriage and the braking face 60 of a stationary muff 61 which is bolted to the front cheek bitt 10. The friction plates are splined to the spooling drums and pin-connected to the carriage, alternately.

A piston 62 surrounds the sleeve 57 and is welded thereto so that the spool 55 moves in concert with such piston 62. The cylinder for the piston is denoted by 63, being provided by the muff between a shoulder at the rear and the piloted nose of a closure plate 64 at the front. Hydraulic fluid is fed to the cylinder through a connection 65, forcing the piston rearwardly against the yielding resistance of a compression spring 66. The brake is thus set by the spring and released by pressure of hydraulic fluid supplied to the cylinder 63.

It will be seen that the spool 55 is provided in its periphery with a circumferential groove 67, and that such groove connects with the inner wall of cylinder 63 by a port 70 and with the extreme rear end of the cylinder 54 by a port 71. The after end of the double-acting piston 53 has a reduced diameter so that pressure fluid supplied through ports 70–71 forces the piston forwardly. Countering pressure, differentially superior, is supplied to the front end of cylinder 54 through a connection 72. Piston 53 thus shuttles in one or the other direction between its two limits of travel according as to whether hydraulic fluid is fed only to the rear end, or to both ends, of the cylinder 54. When shifted to the front limit of travel the selector stem 51 brings the drive spindle 48 into couple with the sun gear 30. The drive then compounds the reductions of three stages of planetary gear systems with that of a final non-planetary system to provide a "low-gear" ratio. When shifted to the rear limit of travel the drive spindle is brought into couple with the sun gear 32, and the drive then has a higher speed ratio in that the first-stage planetary system comprised of elements 30–24–27–15 is isolated. Such "high-gear" ratio, more particularly, compounds the reductions of the second-stage planetary system (elements 32–25–28–15), the third-stage planetary system (elements 35–26–29–15), and the final-stage non-planetary system (elements 36–22–40–15).

It will be apparent, should it be desired, that the third-stage planetary system can be deleted. My above-identified patent shows a winch having two rather than three planetary stages.

Proceeding now to describe the hydraulic circuit, my preferred arrangement is shown in FIG. 2. Two manually actuated control valves 80 and 81, placed convenient to an operator, are provided. These valves are essentially 3-position valves albeit providing greater or lesser flow depending upon the degree to which the valve is opened. Valve 80 is a 4-way valve. The pump 82 leads by a connection 83 to one of the two front-side ports, and a connection 84 leads from the other front-side port to the reservoir 85. A connection 86 fitted with a check-valve 87 extends from one of the two back-side ports to one side of the fluid motor 44. Pressure fluid supplied to this side of the motor turns the output shaft 45 in a direction producing a "haul-in" rotation of the spooling drum. The other side of the fluid motor connects by a line 88 with the other back-side port of the control valve. A connection 90 fitted with a pressure-relief valve 91 extends between lines 86 and 88, and a connection 92 fitted with a counter-balance valve 93 by-passes the check-valve 87. A pilot line 94 establishes the pressure necessary to open said counter-balance valve.

The connection 65 leads from line 83 to the cylinder 63 for the piston 62, and it will be thus seen that the piston is subjected to brake-releasing pressure whenever the control valve 80 is shifted to either its "haul-in" or its "pay-out" position. When occupying the "neutral" position in which it is illustrated, lines 83 and 84 are brought into direct connection and the spring 66 then sets the brake.

Valve 81 is a 4-way 3-position valve with three of the four ports being on the front side. One front-side port connects by a line 95 with the line 88. The other two front-side ports connect one by a line 96 with the line 65, and one by a line 97 with the reservoir 85. The single back-side port connects by the line 72 with the outer end of the cylinder 54. When occupying the centered position in which it is illustrated, valve 81 acting in conjunction with valve 80 gives the spooling drum a high-speed "pay-out" and a low-speed "haul-in," the term "speed" being used in a relative sense. The high speed and low speed result from having line 72 in communication with the high-pressure side and the low-pressure side, respectively, of the pump 82, such communication being established by the line 95. When shifted to one extreme of its endwise travel, the valve 81 provides a high-speed for the drum in both directions of the drum's rotation. A low speed is provided in both directions when valve 81 is shifted to its other extreme. A 2-position valve can self-evidently be used in lieu of the illustrated 3-position valve 81 where the feature of an automatic high-speed pay-out and a low-speed haul-in is not desired.

The valve 100 shown in FIG. 4 is similar to the valve 80 excepting for its permitted setting of the brake while maintaining hydraulic pressure from the pump. Valve 100 is a 5-way valve having three back-side ports one of which connects with a carry-over line 101. In its neutral position the valve spool brings the high-pressure side of the pump 82 into communication with said line 101. In this arrangement the brake-release line connects with one of the three ports of a 3-way shuttle valve 102. The other two ports connect one by a line 103 with the line 86 and one by a line 104 with the line 88. Pressure within line 86 shifts the shuttle spool so that lines 103 and 65 are in communication. Pressure within line 88 shifts the shuttle spool so that lines 104 and 65 are in communication. Brake-releasing pressure is thus supplied to the winch when the spool of the valve 100 is shifted to either of its two end positions.

If desired, the selector stem can be shifted by manual rather than hydraulic pressure. An arrangement for this purpose is shown in FIG. 5. A functioning counterpart 106 of the spool 55 is counter-bored from its outer end. In the wall of this counter-bore three circumferential grooves 107, 108 and 109 are provided. A center-bored plunger 110 fits the counter-bore, and carries balls 111 which lodge in the grooves to lock the spool in any one of three stations, selectively. A rod 112 receives a slide fit in the bore of the plunger, receiving pressure from the thumb of the operator to release the balls against yielding resistance imposed by a spring 113. A selector stem 114 connects the spool with the drive spindle 48, positioning the pinion teeth 50 of the latter either in mesh with the sun pinion 30, the sun pinion 32, or in an inactive position therebetween according as the balls are lodged in the groove 107, the groove 109, or the groove 108, respectively.

The present winch, primarily by reason of its employment of integral-type journals surrounding the terminal necks, presents in each of the two ends a pocket of large diameter enabling the fluid motor and the shift and braking mechanisms to be substantially wholly housed by the winch. I find that I can compact the winch into an overall length of 28 inches. By comparison, the winch of my above-identified patent had an overall length of 42½ inches. The cost and the weight of the winch are also significantly reduced. The large-diameter journal has the yet further advantage of freeing the mounting bolts from any need to counter side moments This very substantially relaxes the requirements of the structure upon which the winch may be mounted.

It will be noted that the present winch can be completely disassembled and reassembled without removing the bitts. This feature greatly facilitates maintenance in that there is no need to use a crane or other lifting device. It should be also pointed out that the two neck prolongations 12 and 13 of the drum are identical, and the brake mechanism and hydraulic motor can thus be applied to either end of the winch, as circumstances and placement of the winch may dictate.

It is believed that the invention will have been clearly understood from the foregoing detailed description of my now-preferred illustrated embodiments. Changes in the details of construction may be resorted to without departing from the spirit of the invention and it is accordingly my intention that no limitations be implied and that the hereto annexed claims be given the broadest interpretation to which the employed language fairly admits.

What I claim is:

1. In a winch, a winding drum having a through-opening in its center provided about the periphery with teeth producing an internal gear, front and aft stationary bitts each providing a journal mounting for a related end of the drum; a respective member one occupying one end portion and the other occupying the other end portion of the drum's open center and each presenting an outwardly directed flange removably bolted to the outer face of the related bitt so as to hold the member stationary, a co-axial series of at least three stages of reduction gear systems housed in said open center of the drum between the stationary members, with each stage comprising a respective set of pinions carried by a respective carrier and in mesh with the internal gear and a respective central gear, the third-stage system having its carrier anchored to one of said stationary members to localize the axes of the concerned pinions, the first-stage and the second-stage carriers being each mounted for rotation so that the concerned pinions have planetary motion, a motor, a member driven by said motor occupying the axial center of the drum and movable into driving engagement with either the first-stage central gear or the second-stage central gear, selectively, means passing rotary motion from the first-stage carrier to the second-stage central gear and from the second-stage carrier to the third-stage central gear, and a means housed in the drum at the end thereof opposite the anchoring stationary member and operable at will for arresting the rotation of the first-stage carrier relative to the drum so as to brake the drum, said drum-breaking means, the three stages of reduction gearing, and said removably bolted stationary members being so formed that upon a removal of said removable stationary members; said breaking means and the three stages of reduction gearing can be disassembled and reassembled through the open ends of the drum without detaching the drum from the ring sections of the bitts.

2. The structure of claim 1 in which the anchoring stationary member is hollow and open at the outer end, and in which the motor for driving the motor-driven member is a reversible fluid housed in the hollow center of said anchoring stationary member.

3. The structure of claim 1 in which the braking means is spring-set and comprises friction discs lying between the first-stage carrier and a braking face presented by the stationary member which lies opposite the anchoring stationary member, said braking stationary member being hollow with the outer end open, the spring for setting the brake and a means for releasing the brake occupying said hollow center of the braking stationary member.

4. Structure according to claim 3 in which the motor for driving said motor-driven member is a fluid motor and wherein the means for releasing the brake comprises a piston-and-cylinder assembly, means being provided causing brake-releasing pressure fluid to be delivered to the cylinder of said piston-and-cylinder assembly automatically in concert with delivery of pressure fluid to either side of the fluid motor.

5. Structure according to claim 3 in which the means for releasing the brake comprises a fluid-pressure operated piston-and-cylinder assembly operatively interconnected with the first-stage carrier for drawing the same toward the braking face against yielding pressure imposed by the spring, the open end of said braking stationary member being closed by a plate removably bolted to the stationary member and serving as a head for the cylinder of said piston-and-cylinder assembly.

6. The structure of claim 1 in which the flanges of said stationary members close one side of said spaces which are occupied by the bearings, and having oil seals closing the other side.

7. The structure of claim 1 in which the journal bearings are integral-type each comprised of a train of balls caught in pockets of a cage and tracking in external and internal surface grooves the former provided in the concerned ring section and the latter provided in the concerned end portion of the drum.

8. Structure according to claim 1 in which the first-stage and second-stage central gears are each hollow and internally toothed, the motor-driven member having external teeth and being movable axially within said hollow centers into driving couple with the selected central gear.

9. Structure according to claim 8 having a double-acting pressure-fluid operated piston-and-cylinder assembly operatively associated with the motor-driven member for actuating the member in its axial movement.

10. In a winch, a winding drum having a through-opening in its center provided about the periphery with teeth producing an internal gear, front and aft stationary bitts each providing a journal mounting for a related end of the drum; a respective stationary member one occupying one end portion and the other occupying the other end portion of the drum's open center and each removably secured to the related bitt, at least two stages of reduction gearing housed in said open center of the drum between said stationary members and comprising for each stage a respective central gear and a respective set of pinions carried by a respective carrier with the pinions meshing both the internal gear and the related central gear, one of said gear systems being a final-stage system having its carrier anchored by the related stationary member to localize the axes of the concerned pinions, the other carrier being mounted for rotation so that the concerned pinions have planetary motion, an input shaft driving the central gear of the planetary gear system, means passing rotary motion from the carrier of the planetary system to the central gear of the final-stage system, a braking means for arresting the rotation of the carrier of the planetary system and taking its purchase from the stationary member opposite said anchoring stationary member, and means for controlling the operation of said braking means, said braking means, the central gears, pinions, and carriers of said reduction gearing, and said removably secured stationary members being so formed that upon a removal of said removable stationary members the braking means and said central gears, pinions, and carriers of the reduction gearing can be disassembled and reassembled through the open ends of the drum without detaching the drum from the bitts.

11. In a winch, a winding drum, a reversible fluid-powered motor, reduction gearing driven from said motor and driving the drum and providing selectively used high-gear and low-gear speed ratios, a brake for the drum, a spring acting to normally set the brake, fluid pressure operated shift means for selecting either the high-gear or the low-gear ratio and including a double-acting piston-cylinder assembly characterized in that the piston is caused to move in one direction upon delivery of pressure fluid to a given one end of the cylinder and in the other direction upon delivery of pressure fluid to both ends of the cylinder, the shift means being so operatively interconnected with the reduction gearing that one of the gear ratios is selected when said piston moves in one direction and the other gear ratio is selected when the piston moves in the other direction; a source of fluid pressure, a manually operated control for delivering pressure fluid from the source to either side of the motor, selectively, for responsively turning the drum in either a haul-in or a pay-out direction a manually operated control having at least two settings one of which causes pressure fluid to be delivered from said source to said given one end of the cylinder and the other of which settings causes pressure fluid to be delivered from said source to both ends of the cylinder, pressure fluid powered means for releasing the brake against yielding pressure imposed by the spring, and means for delivering pressure fluid from the source to the brake-releasing means simultaneously with the delivery of pressure fluid to the motor.

12. Structure according to claim 11, said manually operated control having a third setting which is so correlated to the motor and the cylinder that when the motor is turning the drum in a pay-out direction the pressure fluid is then automatically delivered to the cylinder in the manner which selects a high-gear ratio and when the motor is turning the drum in a haul-in direction the pressure fluid is then automatically delivered to the cylinder in the manner which selects a low-gear ratio.

13. Structure according to claim 11, the pressure fluid powered means for releasing the brake comprising a single-acting piston-and-cylinder assembly, one end of the cylinder of the double-acting assembly being in constant communication with the cylinder of the single-acting assembly.

14. Structure according to claim 11 in which the drum has a through-opening in its center, said motor, the reduction gearing, the shift means, the brake, the brake-setting spring, and the means for releasing the brake being all housed in the drum's open center.

15. Structure according to claim 11 in which the motor occupies an end portion of the drum's open center, the two ends of the drum being alike so that the motor can be assembled in either end selectively, said shift means, the brake, the brake-setting spring, and the means for releasing the brake occupying the end opposite the motor.

16. Structure according to claim 12, said third setting being one which establishes communication between the side of the motor which becomes the high-pressure side when the drum is to be turned in a pay-out direction and a fluid-flow connection which directs pressure fluid to the cylinder of the double-acting piston-cylinder assembly in said manner which selects a high-gear ratio.

References Cited by the Examiner

UNITED STATES PATENTS

| | | | |
|---|---|---|---|
| 1,165,814 | 12/1915 | Tadey | 74—801 X |
| 1,738,811 | 12/1929 | Wilsing | 254—173 |
| 1,792,093 | 2/1931 | Holmes | 74—750 X |
| 2,258,307 | 10/1941 | Vickers | 192—3 |
| 2,367,041 | 1/1945 | Moore et al. | 254—173 X |
| 2,458,459 | 1/1949 | Wright | 74—750 |
| 2,500,326 | 3/1950 | Shaff | 74—750 X |
| 2,927,669 | 3/1960 | Walerowski | 192—3 |
| 3,055,237 | 9/1962 | Magnuson | 74—789 |
| 3,125,200 | 3/1964 | Kaman | 192—3 |
| 3,142,369 | 7/1964 | Atkins | 7—64 |
| 3,167,364 | 1/1965 | Dunn | 308—189 |
| 3,244,405 | 4/1966 | Hanning | 254—186 |

DAVID J. WILLIAMOWSKY, *Primary Examiner.*

J. R. BENEFIEL, *Assistant Examiner.*